3,076,042
PROCESS THERMAL REACTION BETWEEN CARBON TETRACHLORIDE AND PROPYLENE
Harold W. Pitt, Lafayette, John E. Stauffer, Orinda, and Harry Bender, El Cerrito, Calif., assignors to Stauffer Chemical Company, New York, N.Y., a corporation of Delaware
No Drawing. Filed Nov. 25, 1960, Ser. No. 71,432
8 Claims. (Cl. 260—655)

This invention involves the synthesis of 1,1-dichloro-1,3-butadiene directly from the reaction of carbon tetrachloride and propylene.

Various methods, other than that of the present invention, for preparing 1,1-dichloro-1,3-butadiene are shown by the prior art. United States Patent No. 2,581,925 issued to Crane et al., on January 8, 1952, for example, discloses preparing 1,1-dichloro-1,3-butadiene by the addition of $CBrCl_3$ to propene to form 1,1,1-trichloro-3-bromobutane, which in turn is treated with the salt of a strong acid and a weak base, such as $ZnCl_2$, $FeCl_3$, $FeCl_2$, $CdCl_2$, $AlCl_3$, or $ZnSO_4$, at temperatures of 150–250° C. to form 1,1-dichloro-1,3-butadiene.

Another known method of preparing 1,1-dichloro-1,3-butadiene is the pyrolysis of 1,1,1,3-tetrachlorobutane at 450–60° C. In this method the 1,1,1,3-tetrachlorobutane is first prepared by mixing liquid carbon tetrachloride with a mixture of propene and propane along with $Bz_2O_2$ used as an initiator. This mixture is then stirred for 5–6 hours at ten atmospheres pressure at 90° C. to yield 1,1,1,3-tetrachlorobutane.

The present invention, on the other hand, reacts carbon tetrachloride and propylene directly to form 1,1-dichloro-1,3-butadiene at temperatures between 550° C. and 750° C.

This gas phase free radical reaction of carbon tetrachloride and propylene results in yields of 75% and higher and a more economical commercial process for the production of 1,1-dichloro-1,3-butadiene which entails the use of apparatus much simpler than required by the prior art methods.

According to the present invention, the reactants, carbon tetrachloride and propylene in the vapor phase are merely passed through a reaction zone heated to a temperature between 550° C. and 750° C. at approximately atmospheric pressures to yield 1,1-dichloro-1,3-butadiene. The particular pressure employed is not critical in the present invention. Both sub-atmospheric and super-atmospheric pressures as well as atmospheric pressure can be employed successfully.

The reaction zone may be any reaction vessel which is inert under the conditions of the reaction. For example, the reactor could be a coil of Inconel tubing or tubing made of any material which would not interfere with the reaction and could withstand the reaction conditions.

The temperature range employed in the reactor has previously been stated to be between 550° C. and 750° C. These are not absolute temperature limits beyond which no 1,1-dichloro-1,3-butadiene is formed, but rather are arbitrarily set economic temperature limits for the process. At temperatures below 550° C., very small yields of the desired product are obtained even when long retention times are employed. At temperatures around 750° C. the formation of various tars along with the 1,1-dichloro-1,3-butadiene begin to detract from the economic advantages of the process. This same analogy may be drawn with the particular retention times employed in the present reaction. The retention times contemplated in the present invention are from approximately 0.05 second to 2 seconds. Using a temperature of 750° C. and a retention time of 2 seconds large amounts of various tars are formed in the practice of the present invention along with quantities of 1,1-dichloro-1,3-butadiene. When the temperature of the reaction zone is maintained at 550° C. and the retention time is 0.05 second, very small yields of 1,1-dichloro-1,3-butadiene are obtained. Between these extremes of temperature and retention times are the more optimum operating conditions and conversions per pass as high as 50% have been obtained with yields on the order of 75% and higher.

In the practice of the present invention, propylene and carbon tetrachloride vapor are introduced into the reaction zone maintained at a temperature of from 550° C. to 750° C. The reactants may be fed to the reactor separately or as a mixture. They also may be preheated before entering the reactor. These and other deviations or alternatives of the present process such as variations in pressure and the like are obvious to those skilled in the art and are to be considered within the scope of the present invention.

As the reaction products emerge from the reaction zone, any unreacted carbon tetrachloride and/or propylene may be recovered from the reaction products and recirculated to the reaction zone to undergo further reaction to produce 1,1-dichloro-1,3-butadiene. The remaining reaction products after recycle of unreacted carbon tetrachloride and propylene will contain 1,1-dichloro-1,3-butadiene, chloropropenes, chloroform and other products consisting essentially of various tars. The desired product is then separated and collected. The particular means of separation of the product is immaterial with respect to the present invention as any of many known separation techniques will suffice.

The 1,1-dichloro-1,3-butadiene produced by the present invention is a monomer which may be polymerized into a rubbery polymer or copolymerized with styrene, acrylonitrile, butadiene, vinyl acetate, or vinylidene chloride. The 1,1-dichloro-1,3-butadiene is also used as an insecticide or as an intermediate in the preparation of other insecticides.

In all of the following examples, the reaction zone consisted of a reactor coil of ⅜ inch O.D. Inconel tubing having a total volume of 85 cubic centimeters.

*Example 1*

Propylene and carbon tetrachloride vapor was mixed and preheated to 500° C. and then passed through the reactor at 600° C. at approximately 1 atm. pressure. The flow rates were 0.12 g. mole of carbon tetrachloride per minute and 0.208 g. mole of propylene per minute. The calculated retention time was 0.23 second.

The condensed liquid products had the following composition.

| Composition: | Mol. percent |
|---|---|
| Chloropropenes | 0.83 |
| Chloroform | 1.06 |
| Carbon tetrachloride | 97.0 |
| 1,1-dichloro-1,3-butadiene | 0.415 |
| Others | 1.7 |

*Example 2*

The flow rates and the preheating here were the same as those stated in Example 1 supra. The temperature of the reactor was 650° C. and the calculated retention time was 0.22 second. The condensed liquids had the following compositions.

| Composition: | Mol. percent |
|---|---|
| Chloropropenes | 3.06 |
| Chloroform | 3.47 |
| Carbon tetrachloride | 82.7 |
| 1,1-dichloro-1,3-butadiene | 6.85 |
| Others | 4.0 |

Example 3

The flow rates of the reactants were the same as stated in Example 1 supra. The gases were preheated to 600° C. and the reactor temperature was 670° C. The calculated retention time was 0.21 second. The condensed liquids had the following compositions.

| Composition: | Mol. percent |
| --- | --- |
| Chloropropenes | 3.9 |
| Chloroform | 3.8 |
| Carbon tetrachloride | 53.0 |
| 1,1-dichloro-1,3-butadiene | 29.1 |
| Others | 10.2 |

Example 4

The flow rates of the reactants were 0.153 g. mole of carbon tetrachloride per minute and 0.208 g. mole of propylene per minute. The mixed vapors were preheated to 500° C. and then passed through the reactor at 670° C. The calculated retention time was 0.20 second.

The condensed liquid had the following composition.

| Composition: | Mol. percent |
| --- | --- |
| Chloropropenes | 3.0 |
| Chloroform | 4.3 |
| Carbon tetrachloride | 49.5 |
| 1,1-dichloro-1,3-butadiene | 35.2 |
| Others | 8.0 |

In all of the examples given, unreacted propylene was recycled to the reactor.

We claim:

1. A process for preparing 1,1-dichloro-1,3-butadiene comprising reacting carbon tetrachloride and propylene together in the vapor phase.

2. A process for preparing 1,1-dichloro-1,3-butadiene comprising passing a mixture of carbon tetrachloride and propylene through a reaction zone maintained at a temperature between 550° C. and 750° C. and separating 1,1-dichloro-1,3-butadiene from the reaction products.

3. A process as stated in claim 2 wherein any unreacted propylene exiting the reactor is separated from the other exiting materials and recycled to the reaction zone.

4. A process as stated in claim 3 wherein any unreacted carbon tetrachloride exiting the reaction zone is collected and recycled to the reaction zone.

5. A process as stated in claim 1 wherein the retention time is between 0.05 and 2.0 second.

6. A process as stated in claim 2 wherein the retention time is between 0.05 and 2.0 second.

7. A process as stated in claim 3 wherein the retention time is between 0.05 and 2.0 second.

8. A process as stated in claim 4 wherein the retention time is between 0.05 and 2.0 second.

References Cited in the file of this patent

FOREIGN PATENTS 844,442     Germany     July 21, 1952